(12) United States Patent
Lucas et al.

(10) Patent No.: US 11,578,147 B2
(45) Date of Patent: Feb. 14, 2023

(54) OLEFIN POLYMERIZATION PROCESSES

(71) Applicant: ExxonMobil Chemical Patents Inc., Baytown, TX (US)

(72) Inventors: Michael D. Lucas, Houston, TX (US); Philip W. Livanec, Dayton, TX (US); Christian T. Lund, Beaumont, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 177 days.

(21) Appl. No.: 17/194,533

(22) Filed: Mar. 8, 2021

(65) Prior Publication Data

US 2021/0292445 A1    Sep. 23, 2021

Related U.S. Application Data

(60) Provisional application No. 62/990,809, filed on Mar. 17, 2020.

(51) Int. Cl.
*C08F 2/34* (2006.01)
*C08F 6/00* (2006.01)
*C08F 4/52* (2006.01)
*C08F 210/16* (2006.01)

(52) U.S. Cl.
CPC .......... *C08F 2/34* (2013.01); *C08F 4/52* (2013.01); *C08F 6/005* (2013.01)

(58) Field of Classification Search
USPC ....................................................... 528/483
See application file for complete search history.

(56) References Cited

U.S. PATENT DOCUMENTS

| | | | |
|---|---|---|---|
| 4,372,758 A * | 2/1983 | Bobst | C08F 6/005 528/483 |
| 4,543,399 A | 9/1985 | Jenkins, III et al. | |
| 5,182,870 A | 2/1993 | Dighton et al. | |
| 5,306,792 A | 4/1994 | Havas et al. | |
| 8,584,505 B2 | 11/2013 | Penth et al. | |

(Continued)

FOREIGN PATENT DOCUMENTS

| | | |
|---|---|---|
| CN | 204514858 | 3/2015 |
| EP | 0571826 | 2/1997 |
| WO | 2008043201 | 4/2008 |

*Primary Examiner* — Fred M Teskin
(74) *Attorney, Agent, or Firm* — ExxonMobil Chemical Patents Inc.—Law Department

(57) ABSTRACT

In a process for producing an olefin polymer, at least one olefin monomer is polymerized in a polymerization reactor to produce a particulate polymer product containing hydrocarbon impurities including unreacted monomer and other $C_1$ to $C_8$ hydrocarbons. The polymer product is contacted with a gas-containing stream in a stripping vessel under conditions effective to strip hydrocarbon impurities from the polymer product and produce a stripped particulate polymer product and a gaseous first effluent stream containing inert gas and hydrocarbon impurities. The stripped particulate polymer product is recovered and the atmosphere adjacent the stripped particulate polymer product is sensed with a photoionization detector configured to ionize $C_4$ to $C_8$ hydrocarbons. The amount of the gas-containing stream supplied to the stripping vessel is then adjusted based upon such sensing.

15 Claims, 3 Drawing Sheets

(56) References Cited

U.S. PATENT DOCUMENTS

| | | |
|---|---|---|
| 8,904,849 B2 | 12/2014 | Norman et al. |
| 9,128,061 B2 | 9/2015 | Parusel et al. |
| 9,459,235 B2 | 10/2016 | Soundarrajan et al. |
| 10,041,908 B2 | 8/2018 | Kim et al. |
| 10,048,222 B2 | 8/2018 | Agah et al. |
| 10,227,428 B2 | 3/2019 | Goode et al. |
| 2015/0123670 A1 | 5/2015 | Robbat, Jr. et al. |

\* cited by examiner

OLEFIN POLYMERIZATION PROCESSES

CROSS-REFERENCE TO RELATED APPLICATION

This application claims the benefit of U.S. Provisional Application 62/990,809, filed Mar. 17, 2020 entitled "Olefin Polymerization Processes", the entirety of which is incorporated herein.

FIELD

This application relates to olefin polymerization processes and particularly to gas phase olefin polymerization processes.

BACKGROUND

Gas phase catalytic polymerization is a major technology used to produce polyolefin resins. The catalysts used in the process are contained in solid substrate particles from which the polymer chains grow. Gas phase olefin polymerization technology often employs a fluidized bed, where the particles are fluidized by a gas stream also containing the reactants, such as the olefin monomer or monomers. The carrier gas for the catalyst particles is normally an inert gas, especially nitrogen. Processes of this type are described in, for example, EP-A-0 475 603, EP-A-0 089 691 and EP-A-0 571 826, which are hereby incorporated by reference.

In gas phase polymerization processes, the polymer particles produced in the fluidized bed are discharged continuously or discontinuously from the reactor and conveyed pneumatically, generally using nitrogen, to a product recovery system. The polymer particles inevitably contain unreacted monomer as well as other hydrocarbons added to, or produced in, the polymerization process. For example, the polymer particles may contain saturated homologues of the feed monomers produced by hydrogen supplied to the reactor to control the molecular product of the polymer and/or condensable liquids, such as $C_3$ to $C_6$ alkanes, added to assist in heat removal (these may also be referred to as induced condensing agents, or ICAs). Some of these hydrocarbons with molecular weights lighter than air (methane, ethylene, and ethane) evaporate quickly from the polymer product and do not pose a risk. Others are high molecular weight waxes that do not evaporate and remain part of the product. Between these two groups are hydrocarbons that are heavier than air and will eventually evaporate (such as, butene, hexene, hexane and octane). These intermediate molecular weight hydrocarbons can create an explosive atmosphere in downstream equipment if not purged and will be referred to herein as "risk hydrocarbons".

Thus, the product recovery system includes a degassing or purging vessel where unreacted monomers and the risk hydrocarbons are stripped from the polymer particles normally by countercurrent contact with a purge gas, typically nitrogen or a mixture of nitrogen with light hydrocarbons having low solubility in the polymer product. The resulting purged gas stream, diluted with unreacted monomer and heavier hydrocarbons is recovered from the purge vessel and, after separation of the hydrocarbon components through various unit operations such as compression, cooling, condensation, permeation, adsorption etc., may be partially returned to the process as the conveying gas or as part of the purge gas stream.

To establish that the polymer has been stripped of risk hydrocarbons to a safe level, the stripped polymer product recovered from the purge vessel has historically been subjected to experimental testing on a routine frequency. Existing attempts to use continuous detection, typically IR spectroscopy, to monitor risk hydrocarbon levels have often been unsuccessful, especially with Ziegler-Natta catalyzed processes, due to the presence of methane and ethane, byproducts of deactivation of catalyst components in the purger. The relatively high methane and ethane concentrations overwhelm the relatively low concentrations of the risk hydrocarbons in the gas phase on currently used detectors. This prevents a detector from providing positive confirmation of acceptable purging of risk hydrocarbons. As a result of these limitations, it is normal practice to use significantly higher volumes of purge gas than is theoretically necessary to remove the risk hydrocarbons. This in turn leads to large quantities of purge gas being sent to flare and wasted.

There exists therefore a need for an improved process for continuously monitoring the level of risk hydrocarbons in the purged polymer products of olefin polymerization processes and preferably for using the results of the monitoring process to optimize the supply of inert gas to the purging step.

SUMMARY

The present application proposes the use of a photoionization detector to measure the level of residual risk hydrocarbons in the purged polymer product of an olefin polymerization process by detecting hydrocarbons in the gas phase around the polymer product. Since the photoionization energies for methane and ethane are much higher than the photoionization energies for heavier alkanes, using a photoionization detector with an emitter voltage below the photoionization energy of methane/ethane but above that of the risk hydrocarbons, means that only the latter are ionized and detected even in the presence of a large excess of methane/ethane. As a result, the detector reading provides a reliable measure of the risk hydrocarbon level in the purge bin and so can be used to control and optimize the nitrogen flow through the purge bin to ensure a safe level of risk hydrocarbons while minimizing nitrogen wastage.

Thus, in one aspect, the present application provides a process for producing an olefin polymer, the process comprising:
 (a) polymerizing at least one olefin monomer in a polymerization reactor to produce a polymer product comprising particulate polymer product and hydrocarbon impurities, such impurities comprising unreacted monomer and other $C_1$ to $C_8$ hydrocarbons;
 (b) contacting the polymer product with a gas-containing stream in a stripping vessel under conditions effective to strip hydrocarbon impurities from the polymer product and produce a stripped particulate polymer product and a gaseous first effluent stream comprising at least a portion of the hydrocarbon impurities;
 (c) recovering the stripped particulate polymer product;
 (d) sensing the atmosphere adjacent to the recovered stripped particulate polymer product with a photoionization detector configured to photoionize $C_4$ to $C_8$ hydrocarbons without photoionizing methane or ethane; and
 (e) adjusting the amount of the gas-containing stream supplied to the stripping vessel in (b) based at least in part upon the sensing (d).

BRIEF DESCRIPTION OF THE DRAWINGS

FIG. 3(a) is the same as FIG. 2(b), whereas

DETAILED DESCRIPTION OF THE EMBODIMENTS

Figure 1:
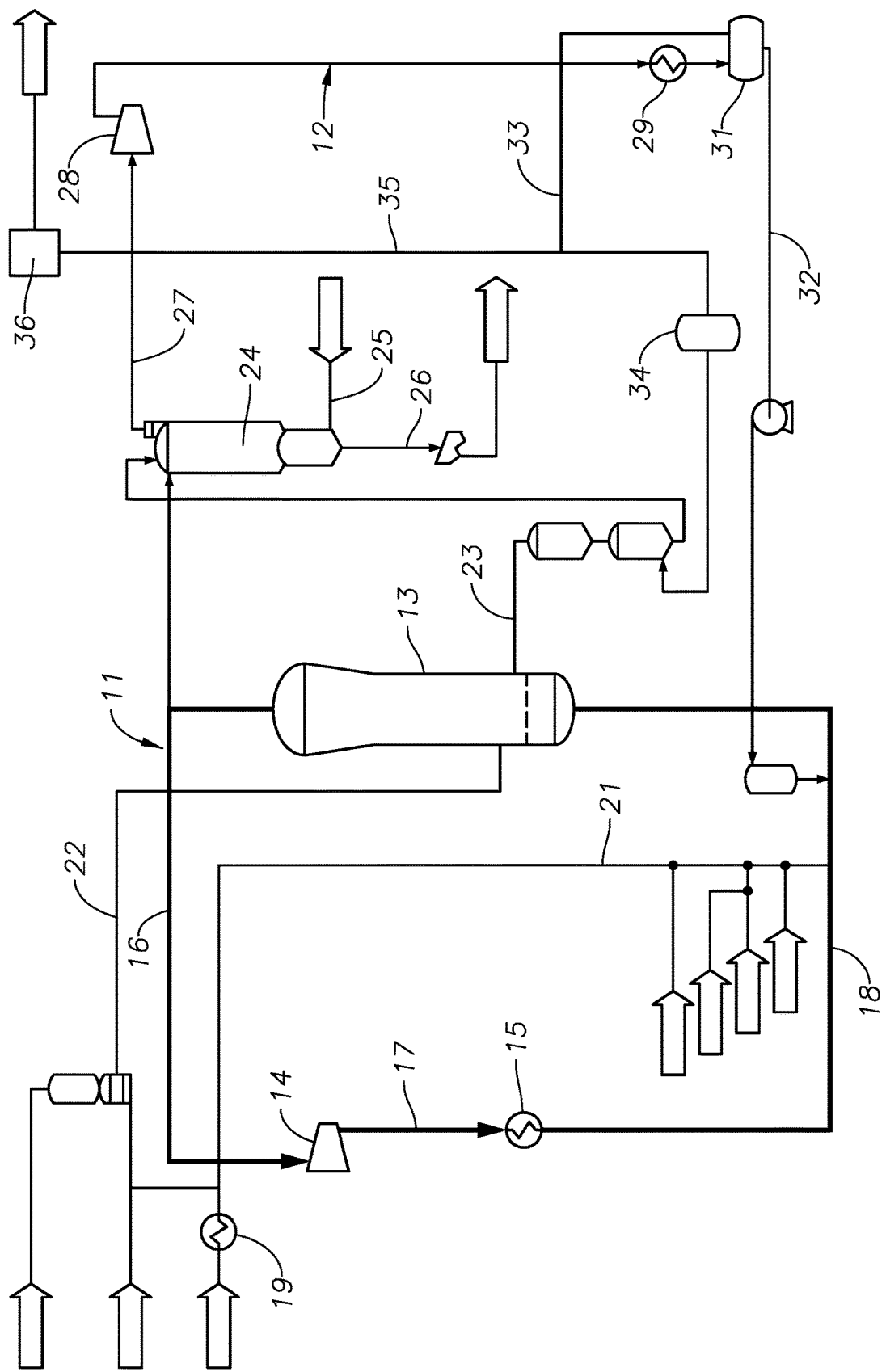
FIG. 1 is a simplified flow diagram of a gas phase ethylene polymerization process according to one embodiment of the present disclosure.

Referring to FIG. 1, the gas phase ethylene polymerization process shown includes a polymer production loop 11 and a polymer recovery loop 12. Connected in series within the polymer production loop 11 are a fluidized bed reactor 13, a cycle gas compressor 14 and a cycle gas cooler 15. The outlet from the reactor 13 is connected by line 16 to the low pressure side of the compressor 14, whose high pressure side is connected via line 17 to the high temperature side of the cooler 15. The low temperature side of the cooler 15 is connected via line 18 to the inlet of the reactor 13.

Fresh ethylene from a pipeline or storage, optionally after heating by a heat exchanger 19, is supplied by line 21 to be mixed with cooled recycled ethylene in line 18 before being introduced into the reactor 13. Also supplied to the reactor 13 via lines 21 and 18 may be one or more $C_3$ to $C_6$ alkanes to assist in heat removal and hydrogen to control the degree of polymerization. One or more comonomers, such as propylene and/or $C_4$ to $C_8$ alpha-olefins, may also be supplied to the reactor 13 via line 21. Nitrogen as a carrier gas for the polymerization catalyst and for fluidizing the growing polymer particles in the reactor is mixed with fresh catalyst from storage and supplied to the reactor 13 via line 22. The reactor 13 is operated under conditions to maintain the monomer(s) in the gas phase and effective to polymerize the monomer(s) to produce an ethylene homopolymer or copolymer. Typical conditions include a temperature of 70 to 110° C. and a pressure of 15 to 25 bar (1500 to 2500 kPa-a).

Polymer product is discharged continuously or discontinuously from the reactor 13 and, as it leaves the reactor, includes the particulate polymer product and various impurities. Impurities in general can include material other than the desired particulate polymer product. It should be noted that such "impurities" may also include raw material valuable for recovery and recycle and/or re-use in the polymerization process—such that the term impurities is used broadly to encompass these various materials leaving the reactor 13 with the desired particulate polymer product. A "hydrocarbon impurity" is more particularly an impurity constituting a hydrocarbon (e.g., unreacted monomer and/or $C_1$ to $C_8$ or higher hydrocarbons of various isomers). For instance, in an ethylene polymerization process (optionally using, e.g., hexene or butene as a comonomer), desired particular polymer product may be ethylene homopolymer and/or ethylene-hexene and/or ethylene-butene copolymer (or some combination thereof). Correspondingly, impurities may include unreacted monomer (ethylene and optionally the alpha-olefin comonomers 1-butene and/or 1-hexene), even though these would represent raw material desired for recovery. Other impurities present in such exemplary reactions may include isomers of the unreacted monomers and/or saturated equivalents of the monomers (e.g., ethane, butane, hexane) and/or other $C_1$ to $C_8$ hydrocarbons. Furthermore, in some gas-phase polymerization processes, induced condensing agents (ICAs) may be used (e.g., $C_3$ to $C_6$ alkanes and other ICAs), as noted previously. Such ICAs may themselves also be present as impurities in the polymer product, e.g., among the $C_1$ to $C_8$ hydrocarbon impurities previously mentioned.

Therefore, more generally, impurities according to various embodiments include unreacted monomer as well as other hydrocarbons added to, or produced in, the polymerization process, e.g., $C_1$ to $C_8$ and potentially heavier hydrocarbons. Some of these hydrocarbons are (1) those having molecular weights lighter than air (methane, ethylene—e.g., unreacted monomer—and ethane), which evaporate quickly from the polymer product and do not pose a risk, although they could (particularly in the case of ethylene) represent valuable raw material that must be recovered. Other hydrocarbons include (2) higher molecular weight waxes that do not evaporate and remain part of the particulate matter in the polymer product. Between these two groups are (3) hydrocarbons that are heavier than air and will eventually evaporate (such as, butene, hexene, hexane and octane). These intermediate molecular weight hydrocarbons (e.g., $C_4$ to $C_8$ hydrocarbons) can create an explosive atmosphere in downstream equipment if not purged and are referred to herein as "risk hydrocarbons".

To recover unreacted monomer and to minimize the risk of fires in downstream processing and storage equipment, the polymer product (comprising particulate polymer product and impurities) leaving the reactor 13 is fed pneumatically via line 23 to a monomer stripping vessel 24 in the polymer recovery loop 12. The polymer product enters the top of the vessel 24 and, as it flows downwardly through the vessel 24, is contacted with fresh and recycled stripping gas supplied to the bottom of the vessel via line 25. The countercurrent contact between the polymer product and the stripping gas flushes out reactor gas entrained in the polymer product and strips and desorbs hydrocarbons, including unreacted monomer, dissolved in the particulate polymer product. The stripping gas is normally a gas inert to the polymerization process, such as nitrogen, but in some cases ethylene can be used as an initial stripping agent to provide a higher ethylene content in the stripping gas effluent and thereby facilitate ethylene recovery. In the latter case, one or more further stripping steps with an inert gas, such as nitrogen, would follow the initial ethylene stripping.

The stripped particulate polymer product exits the bottom of the vessel 24 and is fed via line 26 to a finishing section (not shown), whereas the hydrocarbon impurity-containing stripping gas effluent exits the top of the vessel 24 and is fed via line 27 to the low pressure side of a recovery compressor 28. The high pressure side of the compressor 28 is connected to a condenser 29 where some of the impurities (e.g., hydrocarbon impurities) contained in the compressed stripping gas effluent are cooled and condensed. The condensed liquid is then recovered in a condensed liquids drum 31 before being recycled to the polymer production loop 11 via line 32.

The gaseous component of the stripping gas effluent remaining after passage through the condenser 29 is fed by line 33 to a split where a minor part is removed and, after passage through a surge tank 34, is recycled to line 23 to assist in conveying the polymer product from the reactor 13 to the stripping vessel 24. The remainder of the stripping gas effluent in line 33 is fed by line 35 to a membrane separation system 36 where entrained hydrocarbons are removed from the effluent before the remainder of the effluent is fed to a flare (not shown).

In a commercial-scale gas phase ethylene polymerization process of the type shown in FIG. 1, the amount of stripping gas (e.g., nitrogen, ethylene, or other inert gas with respect to conditions in the stripper) fed to the stripping vessel is typically maintained at a higher level than theoretically necessary because of the difficulty of quickly and continuously determining by conventional chemical analysis the amount of risk hydrocarbons present in the polymer product entering the stripper (and therefore that would be present in the stripping gas effluent, some of which in turn is sent to flare after condensing, via line 35, as described above). It is particularly difficult to sense such risk hydrocarbons in the presence much larger amounts of methane and ethane. For example, the level of risk hydrocarbons in the polymer product may be of the order 200 ppm by weight, whereas the amount of methane and ethane may be of the order 2000 ppm by weight. This excess use of purge gas is not only an economic penalty but also raises environmental concerns.

To address this problem, the presently described methods in various embodiments include sensing the atmosphere adjacent the stripped particulate polymer product, such as that in line 26 (and/or the atmosphere near the stripped particulate polymer product in connection with recovering the particulate polymer product, such as through a screener (not shown in FIG. 1) downstream of line 26), with a photoionization detector. The photoionization detector may be disposed within the screener or near the screener (e.g., with a tubing sample line or other means for conveying atmosphere near the screener to the photoionization detector), as the ordinarily skilled artisan will appreciate with the benefit of this disclosure.

The photoionization detector may be configure to emit photons of particular energy level, so as to excite electrons in certain of the molecules (i.e., photoionize such molecular species) present in the atmosphere near the stripped particulate polymer product, and to detect such photoionized species (thereby being useful for measuring the presence and potentially also the amount of such species, as the skilled artisan would understand). In particular, according to various of the methods described herein, the photoionization detector is preferentially configured to photoionize $C_4$ to $C_8$ hydrocarbons in the atmosphere, while not photoionizing non-target species (e.g., $C_1$ and $C_2$ hydrocarbons, and in particular methane and ethane). Methods may therefore further comprise adjusting the amount of the inert gas-containing stream supplied to the stripping vessel, such as the vessel 24 in FIG. 1, based at least in part upon the sensing carried out by the photoionization detector (e.g., based upon the level of $C_4$ to $C_8$ hydrocarbons measured using the photoionization detector).

In particular embodiments, the photoionization detector may be configured to emit photons having an energy below the photoionization energy for methane but above the photoionization energy for n-butene. In this way, even in the presence of much larger amounts of methane, the detector will only detect the molecules that are photoionized, and is able to lead to an accurate measurement of the risk hydrocarbons in the detected atmosphere. The detector reading can be correlated with the risk hydrocarbons in the stripped particulate polymer to allow a continuous prediction of the remaining risk hydrocarbons in the particulate. Suitable photon emission energies for the photoionization detector may generally be in the range of 8 to 14 eV. However, it is preferred to use emission energies in the range of 8 to 11 eV, such as from a low of any one of 8, 8.5, 9, and 9.5 eV to a high of any one of 9.5, 10, 10.5, 10.6, 10.7, 10.8, 10.9, and 11.0 eV, provided the high end of the range is greater than the low end. For example, the photo emission energy according to some embodiments may be between 9 eV and 10.8 eV.

The level of risk hydrocarbons measured using the photoionization detector can then be used to control a valve or other process flow control mechanism to adjust the amount of nitrogen, ethylene, and/or other stripping gas (e.g., gas-containing stream) supplied to the polymer stripping vessel so that the flow of such gas-containing stream is maintained at a level sufficient to ensure a safe level of risk hydrocarbons while minimizing wastage of the gas-containing stream components (e.g., nitrogen, ethylene, other inert gas, or the like). Typically, the amount of nitrogen, ethylene, or other stripping gas in the gas-containing stream supplied to the polymer stripping vessel is controlled so that the level of risk $C_4$ to $C_8$ hydrocarbons in line 26 (e.g., in the stripped particulate polymer product), as measured using the photoionization detector, is maintained below 10,000 ppm by volume, such as below 2,000 ppm by volume. In this way, the level $C_4$ to $C_8$ hydrocarbons in the stripped particulate polymer product leaving the stripping vessel can be maintained at or below 200 ppm by weight.

The present method of controlling gas-containing stream (e.g., nitrogen, ethylene, and/or other inert gas) flow to the polymer stripping vessel is particularly relevant to polymerization processes using Zeigler-Natta (ZN) catalysts, which require activators, such as triethylaluminum (TEAL) and trimethylaluminum (TMA), to activate the catalyst. These activators in particular decompose into ethane and methane in the polymer stripping vessel. Detectors currently used cannot accurately detect the level of risk hydrocarbons present in ZN-catalyzed systems due to the obscuring impact of methane and ethane. Other catalysts, such as metallocenes, that do not need activators do not produce ethane and methane in the polymer stripping vessel, and may not pose the same challenges as those presented in ZN systems. The present process will still provide a good indication of risk hydrocarbon levels in polymer stripping vessels of metallocene-catalyzed systems.

Figure 2B:
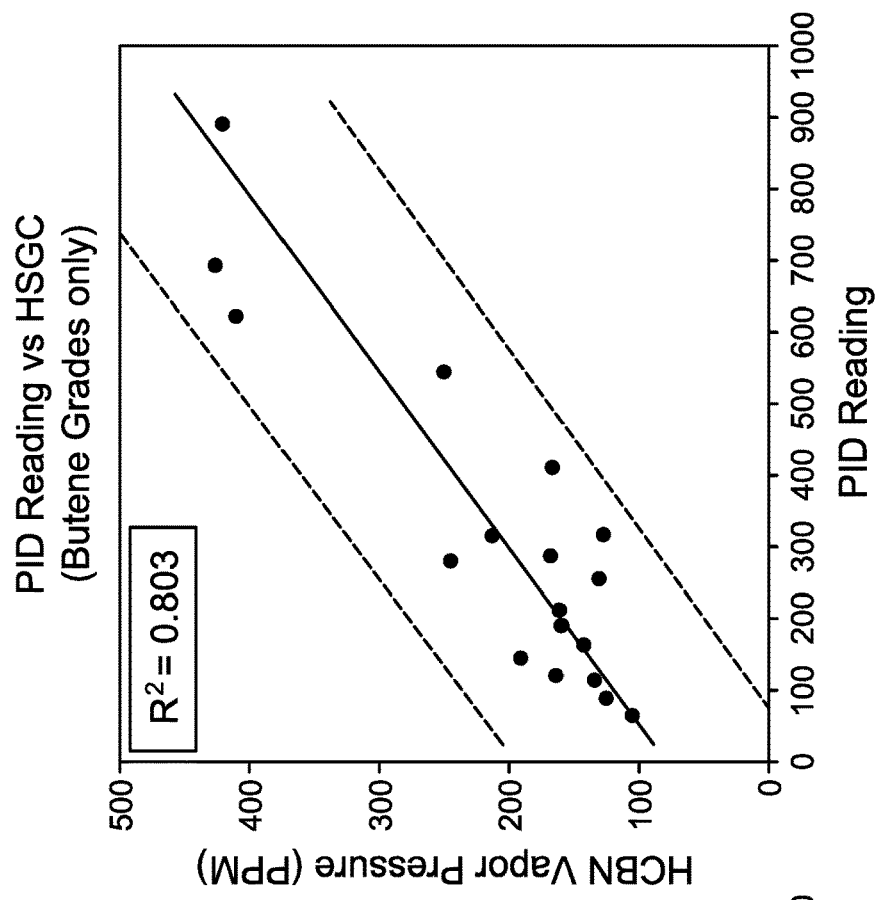
FIG. 2(b) is a graph comparing the hydrocarbon concentration in a gas sample liberated from the direct ethylene/butene copolymer product of a gas phase polymerization reactor employing a metallocene catalyst after passage through a screener and as measured by gas chromatography with the hydrocarbon concentration in the atmosphere within the screener as measured by a photoionization detector.
Figure 2A:
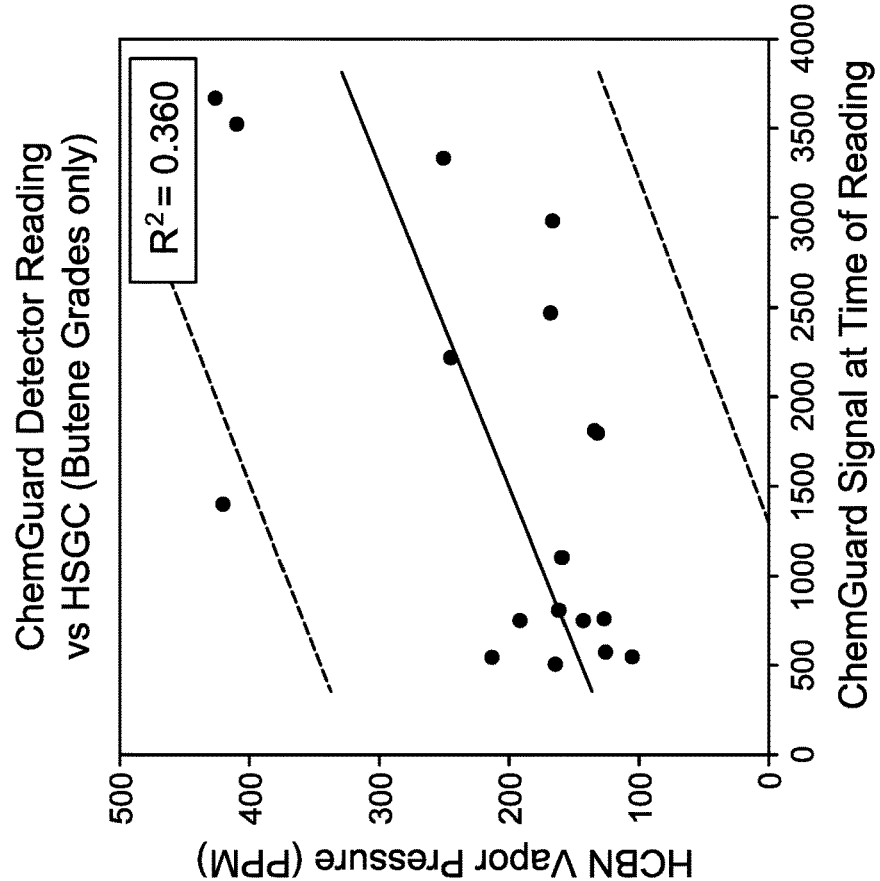
FIG. 2(a) is a graph comparing the hydrocarbon concentration in a gas sample liberated from the direct ethylene/butene copolymer product of a gas phase polymerization reactor employing a Ziegler-Natta catalyst after passage through a screener and as measured by gas chromatography with the hydrocarbon concentration in the atmosphere within the screener as measured by IR spectroscopy.
Figure 3B:
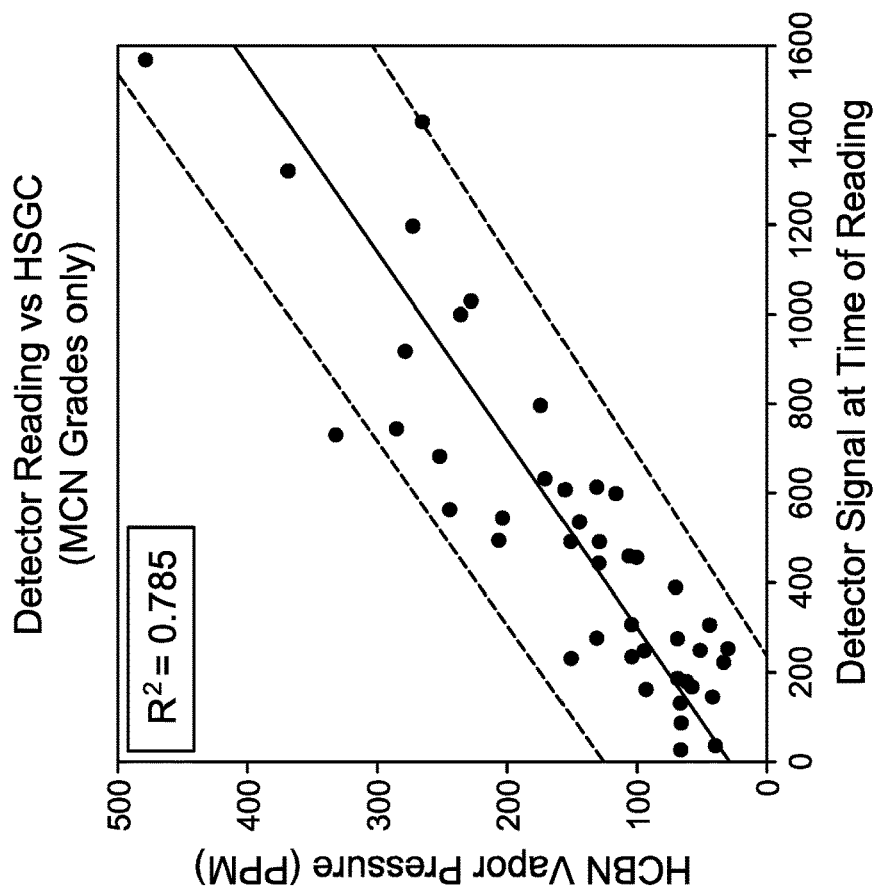
FIG. 3(b) is a graph comparing the hydrocarbon concentration in a gas sample liberated from the direct ethylene/hexene copolymer product of a gas phase polymerization reactor employing a metallocene catalyst after passage through a screener and as measured by gas chromatography with the hydrocarbon concentration in the atmosphere within the screener as measured by IR spectroscopy.
Figure 3A:
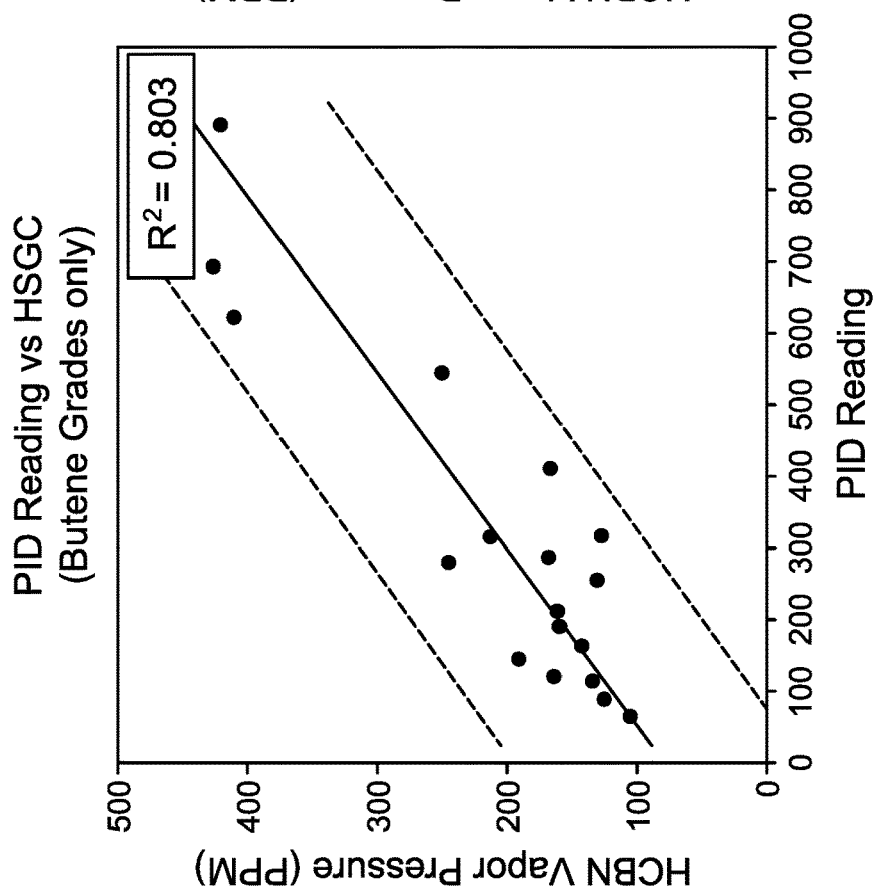

The invention will now be more particularly described with reference to the following non-limiting Examples and FIGS. 2(a) and (b) and FIGS. 3(a) and (b) of the accompanying drawings.

Example 1

A sample of an ethylene/butene copolymer product of a gas phase polymerization reactor employing a Ziegler-Natta catalyst was removed from the stripped product in line 26 in FIG. 1, after screening the product to remove aggregates. The hydrocarbon content of the atmosphere within the screener was instantaneously analyzed by IR spectroscopy and the product sample was heated in a vial in a 100° C. oven for 4 hours to completely volatilize any volatile hydrocarbons entrained in the product sample (including risk hydrocarbons). The head gas in the vial was supplied to a gas chromatograph for identification and measurement of the different hydrocarbons in the head gas (a process that typically takes about 8 hours). The dual measurement process was repeated twice a week over a period of 4 months. A comparison of the different measurements is shown in FIG. 2(a) from which it can be seen that the correlation, $R^2$, between the IR results and the GC standard was only 0.360, where a perfect correlation would have been 1.

Example 2

The procedure of Example 1 was repeated but with the composition of the head has being analyzed by a photoionization detector (PID) set to emit photons at energy of 10.6 eV. A comparison of the PID and GC measurements in shown in FIG. 2(b) from which it can be seen that the correlation, $R^2$, between PID results and the GC standard was 0.803, significantly higher than the correlation with the IR detector and suitable for use in a predictive manner.

Example 3

The procedure of Example 1 was repeated but with the samples tested being of an ethylene/hexene copolymer product of a gas phase polymerization reactor employing a metallocene catalyst. A comparison of the IR and GC measurements is shown in FIG. 3 (b) from which it can be seen that the correlation, $R^2$, between IR results and the GC standard was 0.785, that is similar to but slightly inferior to the correlation between the PID and GC measurements with Ziegler-Natta product. The metallocene correlation is already used in a predictive manner—the higher $R^2$ for the PID correlation indicates that the PID is also suitable for predictive use in this application While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A process for producing an olefin polymer, the process comprising:
   (a) polymerizing at least one olefin monomer in a polymerization reactor to produce a polymer product comprising particulate polymer product and hydrocarbon impurities, such impurities comprising unreacted monomer and other $C_1$ to $C_8$ hydrocarbons;
   (b) contacting the polymer product with a gas-containing stream in a stripping vessel under conditions effective to strip hydrocarbon impurities from the polymer product and produce a stripped particulate polymer product and a gaseous first effluent stream comprising at least a portion of the hydrocarbon impurities;
   (c) recovering the stripped particulate polymer product;
   (d) sensing the atmosphere adjacent to the recovered stripped particulate polymer product with a photoionization detector configured to photoionize $C_4$ to $C_8$ hydrocarbons without photoionizing methane or ethane; and
   (e) adjusting the amount of the gas-containing stream supplied to the stripping vessel in (b) based at least in part upon the sensing (d).

2. The process of claim 1, wherein the at least one olefin monomer comprises ethylene.

3. The process of claim 1, wherein the at least one olefin monomer comprises ethylene and at least one of propylene and a $C_4$ to $C_8$ alpha-olefin.

4. The process of claim 1, wherein (c) recovering the stripped particulate polymer product comprises passing the stripped particulate polymer product through a screener, and further wherein (d) sensing the atmosphere adjacent to the recovered stripped particulate polymer product comprises sensing the atmosphere near the screener.

5. The process of claim 1, wherein the gas-containing stream comprises an inert gas.

6. The process of claim 5, wherein the inert gas comprises nitrogen.

7. The process of claim 5, wherein the gas-containing stream further comprises ethylene.

8. The process of claim 1, wherein the polymerizing (a) is conducted under conditions such that the at least one olefin monomer is in the gas phase.

9. The process of claim 1, wherein the polymerizing (a) is conducted under conditions including a temperature of 70 to 110° C. and a pressure of 15 to 25 bar (1500 to 2500 kPa-a).

10. The process of claim 1, wherein the polymerizing (a) is conducted in the presence of a fluidized bed comprising Ziegler-Natta catalyst particles.

11. The process of claim 1, wherein the photoionization detector is configured to emit photons having an energy below the photoionization energy for methane and above the photoionization energy for n-butene.

12. The process of claim 1, wherein the photoionization detector is configured to emit photons having an energy between 8 and 11 eV.

13. The process of claim 1, wherein the photoionization detector is configured to emit photons having an energy between 9 and 10.8 eV.

14. The process of claim 1, wherein the amount of the gas-containing stream supplied to the stripping vessel in (b) is adjusted to maintain the level of $C_4$ to $C_8$ hydrocarbons in the stripped particulate polymer product to less than 10,000 ppm by volume.

15. The process of a claim 1, wherein the amount of the gas-containing stream supplied to the stripping vessel in (b) is adjusted to maintain the level of $C_4$ to $C_8$ hydrocarbons in the stripped particulate polymer product to less than 2,000 ppm by volume.

* * * * *